United States Patent [19]

Kramer et al.

[11] Patent Number: 5,664,040
[45] Date of Patent: Sep. 2, 1997

[54] FIBER OPTIC ASSEMBLY AND METHOD OF MAKING SAME

[75] Inventors: Daniel P. Kramer, Centerville, Ohio; Thomas M. Beckman, Barkhamstead, Conn.

[73] Assignee: The United States of America as represented by the Department of Energy, Washington, D.C.

[21] Appl. No.: 520,635

[22] Filed: Aug. 29, 1995

[51] Int. Cl.$^6$ .................................................. G02B 6/16
[52] U.S. Cl. .......................... 385/78; 385/72; 385/123; 65/59.4; 65/387
[58] Field of Search .............................. 385/78, 76, 86, 385/72, 123, 124, 126; 65/59.4, 59.34, 387, 604; 606/4

[56] References Cited

U.S. PATENT DOCUMENTS

| | | | |
|---|---|---|---|
| 4,287,427 | 9/1981 | Scifres | 250/577 |
| 4,536,203 | 8/1985 | Kramer | 65/29 |
| 4,612,029 | 9/1986 | Kramer et al. | 65/59.24 |
| 4,617,044 | 10/1986 | Kramer et al. | 65/49 |
| 4,705,585 | 11/1987 | Kelly et al. | 156/89 |
| 5,143,531 | 9/1992 | Kramer | 65/3.11 |
| 5,337,387 | 8/1994 | Kramer | 385/76 |
| 5,423,798 | 6/1995 | Crow | 606/4 |

*Primary Examiner*—Phan T. H. Palmer
*Attorney, Agent, or Firm*—Russell D. Elliott; James H. Chafin; William R. Moser

[57] ABSTRACT

There is provided an assembly having a light guiding medium sealed to a holder. Preferably the holder is a metal shell and a light guiding medium is an optical fiber of glass or sapphire whisker. The assembly includes a sealing medium which sealingly engages the metal holder to the fiber. In the formation of the assembly, the seal is essentially hermetic having a capability of minimizing leakage having a helium leak rate of less than $1 \times 10^{-8}$ cubic centimeters per second and high strength having a capability of withstanding pressures of 100,000 psi or greater. The features of the assembly are obtained by a specific preparation method and by selection of specific starting materials. The fiber is selected to have a sufficiently high coefficient of thermal expansion which minimizes strains in the component during fabrication, as a result of fabrication, and during use. The other components are selected to be of a material having compatible coefficients of thermal expansion (TEC) where the TEC of the holder is greater than or equal to the TEC of the sealing material. The TEC of the sealing material is in turn greater than or equal to the TEC of the fiber. It is preferred that the materials be selected so that their respective coefficients of thermal expansion are as close as possible to one another and they may all be equal.

18 Claims, 1 Drawing Sheet

FIBER OPTIC ASSEMBLY AND METHOD OF MAKING SAME

GOVERNMENT RIGHTS

The United States Government has rights in this invention pursuant to Contract No. DE-AC04-88DP4395 awarded by the United States Department of Energy to E.G.& G. Mound Applied Technologies.

FIELD OF THE INVENTION

The present invention relates generally to an assembly having a light guiding medium retained within a holder with a sealing medium sealingly engaging the light guiding medium to the holder. The invention also relates to a method of making such an assembly wherein a fiber optic is formed in situ in the assembly.

BACKGROUND OF THE INVENTION

A light guiding medium, also referred to as fiber optical light guide or optic fiber, can be found in a variety of applications. They include telecommunication optical fiber cable, pyrotechnic optical fiber ignitor, and for modulation of light in order to sense liquid levels. In a typical application, the fiber optical light guide consists of a core material with a refractive index which is slightly higher than that of the so-called cladding material surrounding it. The guided light is confined mainly to the core material, with a small amount of light intensity being present or dissipated in the cladding material. If the cladding material is made sufficiently thin or is completely removed, then the optical wave in the thin cladding or the light near the outer edge of the core interacts with or dissipates into the surrounding medium. In the case of liquid level sensing as exemplified in U.S. Pat. No. 4,287,427, a typical detection system includes an optical fiber, a light source at one end of the fiber, and a detector at the other end. The dissipation into the surrounding medium is utilized to modulate a light signal. When liquid dissipates the guided light, no optical signal is observed by the detector. In the case of telecommunication systems, it is necessary to have specific fiber optic assemblies which are headers, feed-throughs, and connectors. Feed-throughs are devices that could be bolted to the wall of a metal housing. In use, an optical fiber cable would be screwed to the feed-through on the inside wall while another optical fiber cable would be screwed on the outside wall. A connector would be used to put together two links of optical fiber cable. Such fiber optics connectors and feed-throughs are an integral part of the telecommunication industry. In another application pertaining to energetic devices, such devices are used as ignitors, squibs, and detonators. Air bags in automobiles use such energetic components to ignite sodium azide. In the past, energetic components contained a bridgewire. These devices function by passing an electrical signal through lead wires to metal pins which are electrically isolated and sealed within the shell. Welded into the tops of the two metal pins is a thin wire called the bridgewire. The energetic material is placed around and/or next to the bridgewire. During functioning, the electrical signal is passed through the wires via the metal pins to the bridgewire. The bridgewire heats up and ignites the energetic material. However, bridgewire components can be inadvertently set off by lightning, high power radars, radio waves, and the like. Optical fiber components are inherently safer than bridgewire components as they are essentially impervious to lightning, high power radar, radio wave interference, and the like.

Optical fibers may be used in environments which are highly corrosive. Assemblies containing optical fiber are suitable in many applications where electrical assemblies are unsuitable. In view of these hostile environments, the fiber is incorporated into an assembly which effectively isolates or insulates it to minimize or prevent communication of the ambient environment with the environment within which the fiber is disposed. Accordingly, the assembly carrying the fiber must have an essentially hermetic seal which is helium-leak-tight to less than $1 \times 10^{-8}$ cubic centimeters per second. U.S. Pat. No. 5,143,531 shows a glass-to-glass hermetic sealing technique to splice links of glass fiber together. A solid glass pre-form is inserted into a cavity of a metal component which is then heated to melt the glass. An end of an optical fiber is then advanced into the molten glass and the entire structure cooled to solidify the glass in sealing engagement with the optical fiber end and the metal cavity. The surface of the resolidified glass may be machined for mating engagement with another component to make, for example, a spliced fiber optic connection. U.S. Pat. Nos. 4,287,427 and 5,143,531 are incorporated herein by reference in their entirety.

Although the technique described in U.S. Pat. No. 5,143,531 has certain advantages in that it does not require use of any foreign sealing material such as solder, the components of the assembly are subject to being highly stressed or exhibit cracks, either as a result of fabrication or during use.

SUMMARY OF THE INVENTION

There is provided an assembly having a light guiding medium sealed to a holder. Preferably the holder is a metal shell and a light guiding medium is an optical fiber of glass or sapphire whisker. The assembly includes a sealing medium which sealingly engages the metal holder to the fiber. In the formation of the assembly, the seal is essentially hermetic having a capability of minimizing leakage having a helium leak rate of less than $1 \times 10^{-8}$ cubic centimeters per second and high strength having a capability of withstanding pressures of 100,000 psi or greater. The features of the assembly are obtained by a specific preparation method and by selection of specific starting materials. The fiber is selected to have a sufficiently high coefficient of thermal expansion which minimizes strains in the component during fabrication, as a result of fabrication, and during use. The other components are selected to be of a material having compatible coefficients of thermal expansion (TEC) where the TEC of the holder is greater than or equal to the TEC of the sealing material. The TEC of the sealing material is in turn greater than or equal to the TEC of the fiber. It is preferred that the materials be selected so that their respective coefficients of thermal expansion are as close as possible to one another and they may all be equal. In any event, the TEC of the fiber should not be greater than the TEC of the sealing material; the TEC of the sealing material should not be greater than the TEC of the holder. Since the TEC of the sealing material is between the TEC of the holder and the TEC of the fiber, the preferred TEC of the sealing material will vary depending on the selected fiber and holder.

In general, it is preferred to use a glass fiber or sapphire fiber whicker which has a TEC which can range from about 50 to about $120 \times 10^{-7}$ cm/cm/°C. A preferred holder is a metal shell having a TEC of about 100 to about $200 \times 10^{-7}$ cm/cm/°C. Accordingly, the TEC of the sealing material is in a range of about 50 to about $220 \times 10^{-7}$ cm/cm°C., desirably in a range of about 75 to about $150 \times 10^{-7}$ cm/cm/°C., and preferably about 75 to about $100 \times 10^{-7}$ cm/cm/°C. In one preferred embodiment, the fiber is a sapphire whisker having a TEC of about 75×10$^{-7}$ cm/cm/°C. and the sealing material is a glass with a TEC of about 75 to about 100×10$^{-7}$ cm/cm/°C. All of the TECs set forth above are established in a range of about room temperature, nominally, about 25° C. and up to about 400° C. Importantly, the tensile strength of the sapphire fiber is about 350 to about 700 MPa or about 50 to about 100 ksi. Advantageously, this tensile strength is about 5 to about 10 times greater than that of a conventional fused silica optical fiber whose buffer has been removed. The compressive strength is about 350,000 psi. The fiber has an index of refraction (IOR) greater than that of the glass. A suitable range for the sapphire fiber is about 1.70 to about 1.80. Preferably the fiber has an IOR of about 1.76 and the glass 1.50.

In the method of the invention, the assembly having the light guiding medium (optical fiber) sealed to a holder is prepared by first forming the light guiding medium having the TEC and strength properties described above and preferably a high thermal expansion of approximately 70 to 100×10$^{-7}$ cm/cm/°C., a high softening point of about 900° C. to about 2000° C. (which is defined as the temperature at which the fiber will deform under its own weight). Next, a sealing medium is formed having a TEC greater than or equal to that of the fiber and a softening point less than that of the fiber. The sealing medium is preferably a glass having a softening point in the range of about 700° C. to about 900° C. A holder is prepared, preferably of metal, for retaining the fiber and sealing medium (sealing glass or cladding). The holder has a TEC greater than or equal to that of the sealing medium, and a melting point greater than that of the sealing glass.

In one embodiment, the fiber and sealing medium are arranged within the holder and then heat is applied to an external surface of the holder to soften or achieve a molten state of the sealing medium whereby in its molten state the sealing medium conforms to the contour of the cavity formed by the holder and encompasses the fiber. Upon cooling the fiber is sealingly engaged to the holder by the sealing medium.

in another embodiment, the fiber is arranged within the holder and the sealing medium is heated to a molten condition and then placed into the holder. The sealing medium is cooled to solidify it and form a seal between the fiber and the holder.

In still another embodiment, the sealing medium is placed in the holder and then heated and once a molten state is achieved, the fiber is inserted through an opening in the holder while maintaining the sealing medium in its molten state. Upon cooling of the sealing medium, the fiber is sealingly engaged to the holder. The sealing medium clads at least a portion of the axial extent of the fiber and preferably the entire axial extent of the fiber. Each of the foregoing embodiments require properly selecting thermal expansion coefficients and high strength fiber. An assembly is prepared while at the same time preventing or at least minimizing formation of cracks and thermal stresses in the assembly.

DESCRIPTION OF THE PREFERRED EMBODIMENTS

Before describing the preferred embodiments, it is helpful to understand the problem to which the invention is directed.

Figure 1:
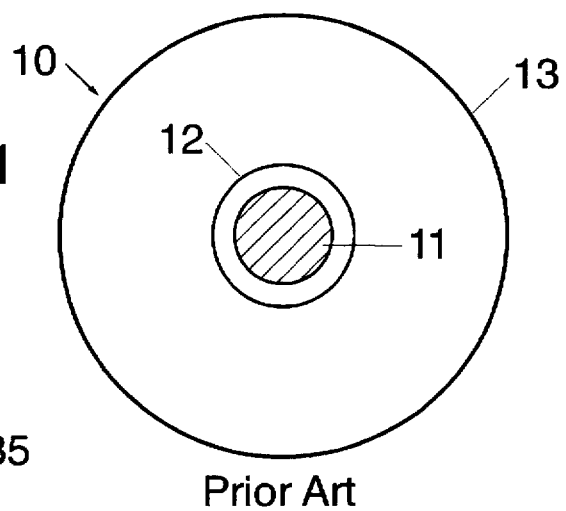
FIG. 1 is a diagrammatic view of a section of a conventional prior art fiber optic assembly.

FIG. 1 shows a schematic drawing of a typical optical fiber presently used in the development of optical fiber assemblies. These fibers were developed for use in the telecommunication industry. Such a fiber 10 consists of a fused silica core 11 surrounded by a fused silica cladding 12 which is protected by a plastic buffer 13. In order for the optical fiber to function properly it is necessary to vary the chemical composition of the core or of the cladding slightly. This is accomplished using various techniques to ensure that the index of refraction of the cladding is slightly lower than the index of refraction of the core. This ensures that the light within the fiber will reflect down the length of the fiber with minimal loss. Fused silica used in most commercial optical fibers is available in high purity; is relatively inexpensive; is relatively chemically inert; and has a very low coefficient of thermal expansion on the order of about 8×10$^{-7}$ cm/cm/°C. (RT/400° C.). The principal disadvantage of such fused silica fibers typically used today is their very low thermal expansion coefficient and their relatively low strength when the buffer is removed to facilitate sealing to form an assembly.

many fiber optic assemblies, particularly those used in hostile environments, are fabricated using a metal shell, a sealing medium, and the optical fiber. The difficulty in fabricating these components is that most metals have a relatively high TEC, for example, 304 stainless steel has a TEC of about 180×10$^{-7}$ cm/cm/°C. (RT/400° C.) which, when used in forming components with fused silica optical fibers often results in either highly stressed or cracked components.

Figure 2:
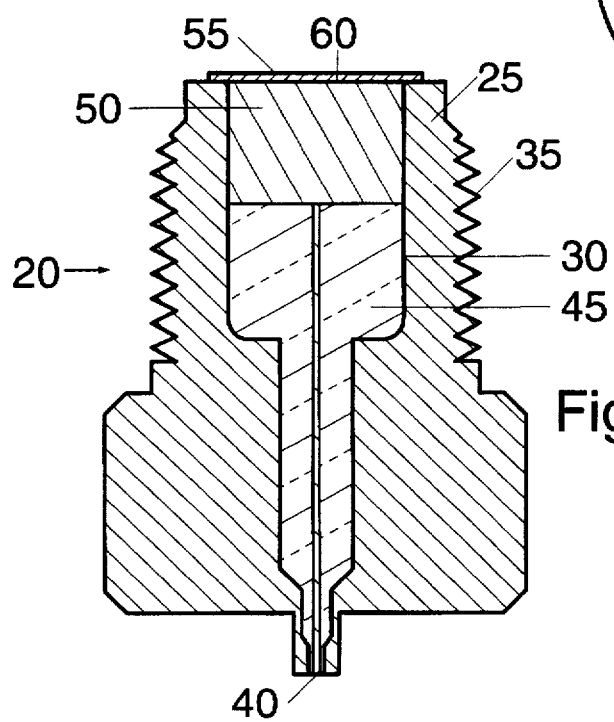
FIG. 2 is a perspective view illustrating an assembly prepared by the method of the invention.

The assemblies of the invention and the method of the invention overcome such problems. This is accomplished by selecting specific materials for the formulation of an assembly 20 as exemplified in FIG. 2. By way of example, this particular component consists of a holder 25 in the form of a shell defining a cavity 30. The holder 25 has, in this embodiment, external threads 35 for threaded engagement within an opening of the device (not shown) within which the assembly 20 is to be used. The completed assembly 20 as shown in FIG. 2 exemplifies an embodiment for an energetic or pyrotechnic device in which the optical fiber 40 is included within the shell 25 and essentially centrally located within the cavity 30 of the shell 25. The fiber 40 is encompassed by the sealing material 45 which, in this embodiment, encompasses the fiber 40 along its entire axial length. A portion of the cavity 30 not occupied by the fiber 40 or sealing material 45 is filled with a pyrotechnic material 50. A disk 55 at an opening 60 of the cavity 30 seals it.

In the method of the invention, the fiber 40 is selected to have a high thermal expansion greater than about 50×10$^{-7}$ cm/cm/°C., desirably 50 to 120×10$^{-7}$ cm/cm/°C., and preferably greater than 75×10$^{-7}$ cm/cm/°C. (RT/400° C.) and a high softening point of about 800° C. to about 2000° C. (which is defined as the temperature at which the fiber will deform under its own weight). This fiber may be first melted and then formed into rods about 0.2 inches diameter by about 2 inches long. Fibers are then formed from the rods by heating them in a gas flame and pulling the ends of the rods apart. Small diameter fibers of about 0.004 inches diameter or smaller can easily be made. A metal holder is prepared with a TEC greater than the fiber and which ranges up to about 220×10$^{-7}$ cm/cm/°C.

It is preferred that the fiber be a whisker having a TEC of $75 \times 10^{-7}$ cm/cm/°C. at temperatures in a range of 25° C. to 400° C. and a softening or melting point greater than 900° C. and preferably about 2000° C. Although, sapphire is preferred, the present invention also contemplates glass fibers having a relatively high TEC of about $100 \times 10^{-7}$ cm/cm/°C. (25° C. to 400° C.) and a softening point of at least 900° C. and preferably 1000° C. or higher. Sapphire also has very high scratch resistance and a relatively high tensile strength being about 5 to about 10 times greater than that of fused silica optical fiber whose buffer has been removed.

The sealing material is formulated to have a TEC which is equal to or higher than the TEC of the fiber, but less than the TEC of the metal shell material. This ensures that the coefficient of thermal expansion relationship is TEC of metal greater than TEC of sealing material greater than TEC of fiber so as to result in minimization of resultant stresses and cracking while ensuring a good hermetic seal. As this assembly cools, the shell will squeeze down on the sapphire whisker. This is highly desirable because ceramic material such as the pre-form (sealing glass) are very strong in compression but weak in tension. Accordingly, the TEC of the sealing material is in a range of about 50 to about $220 \times 10^{-7}$ cm/cm/°C., desirably in a range of about 75 to about $150 \times 10^{-7}$ cm/cm/°C., and preferably about 75 to about $100 \times 10^{-7}$ cm/cm/°C. The sealing material has a softening point preferably in the range of about 700° C. to about 900° C. which is less than that of the fiber. In some instances, the softening point could be as low as 400° C., however, in glasses having such a low softening point, some degree of chemical durability is usually lost. The sealing material has an index of refraction which is less than that of the fiber. After forming the fiber and glass sealing material, the components are fabricated into an assembly.

Figure 3:
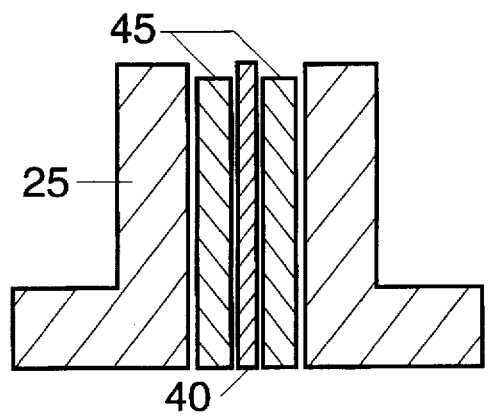
FIG. 3 is a diagrammatic side elevation view, in section, illustrating an initial step in the method of the invention.
Figure 4:
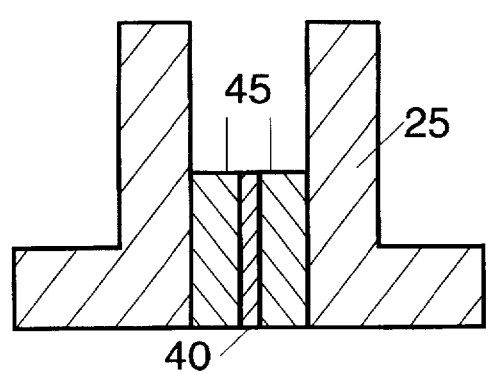
FIG. 4 is a diagrammatic view, similar to FIG. 3, illustrating a successive step in the method of the invention.

FIG. 3 shows a schematic of the components prior to sealing in a furnace. FIG. 4 shows a schematic of the finished component after sealing and final machining. The components are heated to a temperature in a range of about 800° C. to about 1000° C. for about 15 to 120 minutes. Desirably the conditions for heating are about 860° C. for 1 hour with a heating ramp of about 15° C. per minute with a cooling ramp of about 7° C. per minute. Preferred temperature is in the range of about 825° C. to 925° C. for 30 to 90 minutes. Such conditions allow the sealing material (glass) to melt, flow, and form a seal to the metal shell and to the fiber.

This process also results in the self-formation of an optical fiber or wave guide. This occurs by sealing the sealing material (glass) selected to have an index of refraction, for example, approximately 1.5, which is less than that of the fiber, for example, a sapphire whisker, having an index of refraction of approximately 1.76. In essence, by the method of the invention, the sapphire fiber becomes the core of the optical fiber and the sealing glass becomes the cladding. Accordingly, by the correct selection and/or formulation of the sealing material and of the fiber, and by the correct selection of sealing parameters, time and temperature, the sealing material can be heated to just above its softening point so that the glass flows and forms a seal with the metal shell and with the fiber. At the same time, as stated, proper selection of the indices of refraction of the components result in the formation of a self-forming optical fiber with high thermal expansion optical fiber and prevention, or at least minimization, of thermal stresses and cracking.

EXAMPLE

This example describes a technique which has been successfully used in the manufacture of the high strength optical fiber assembly of the invention. The assembly was formed using a high strength single crystal sapphire whisker as the core of the optical fiber. The single crystal sapphire has a coefficient of thermal expansion of about $75 \times 10^{-7}$ cm/cm/°C. (about 25° C. to about 400° C.) and a tensile strength of about 50 to about 100 ksi. Other materials having similar physical characteristics and optical properties could also be used. Its index of refraction was approximately 1.76 and is known to be in a range of about 1.70 to about 1.80. The sapphire whisker and glass sealing material were arranged in the metal shell as shown in FIG. 3. The assembly was then heated to approximately 900° C. which allowed the glass to melt, flow, and form a seal to the metal shell and to the sapphire whisker. For this specific example, the furnace temperature was maintained at approximately 860° C. for 1 hour with a heating ramp of approximately 15° C. per minute and a cooling ramp of approximately 7° C. per minute. The specific composition of the sealing material (cladding also referred to as pre-form glass) and the metal shell are given in Table I. The sapphire fiber was approximately greater than 98 percent aluminum oxide single crystal. Sapphire is known in its natural state as conundrum. Synthetic sapphires are easily made from aluminum oxide by the single crystal growing technique for use as gems, and for a variety of applications. Known advantages of sapphire are flexural strength at elevated temperatures, good dialectic properties, excellent abrasion resistance, small diameter rigidity, low loss characteristics, and zero porosity. The conundrum modification of aluminum oxide, $Al_2O_3$, is mined in a variety of locations. But synthetic sapphire is preferred for optical fiber due to the high purity of the synthetic sapphire as prepared by the single crystal growing technique. The tensile strength of single crystal sapphire and or glass fibers is highly dependent on processing technique and subsequent handling of the actual fibers. In their pristine state, fibers may have tensile strengths of about 200,000 psi. However, the tensile strength of glass fibers after handling may be only about 10,000 psi. The tensile strength of single crystal sapphire is typically higher than that of glass fibers. The tensile strength of sapphire is reported to be about 50 to about 100,000 psi. Sapphire has a reported compressive strength of about 350,000 psi while the compressive strength of glasses is again dependent on handling and composition. For glass, it is estimated to be about 30 to about 80,000 psi.

TABLE I

The Composition of the Sealing Glass in Weight Percent

|  | Preferred | Range |
|---|---|---|
| Potassium Oxide | ~5 | 0–10 |
| Sodium Oxide | ~15 | 0–15 |
| Zinc Oxide | ~1 | 0–5 |
| Aluminum Oxide | ~12 | 0–15 |
| Boric Oxide | ~17 | 0–20 |
| Silica | ~50 | 40–65 |

Typically, when the assembly of FIG. 3 is heated the sealing material (glass) melts and flows down over the fiber and down the interior walls of the metal shell. The next step is to machine the sealing glass and the fiber so that a cavity of known dimensions is formed within the shell (FIGS. 2 and 4). This cavity is later filled with the energetic pyrotechnic material. This results in formation of the assembly as shown in FIG. 2. Such sapphire whisker containing assemblies as in FIG. 2 were prepared and characteristics measured. The specific components illustrated in the example and in FIG. 2 included a metal shell having a diameter of approximately 0.6 inches, sealing glass having a diameter of about 0.4 inches, and sapphire fiber having a diameter of about 0.004 inches. In such a pyrotechnic arrangement, it is typical to have the central fiber of a dimension of 0.003 to 0.020 inches, sealing glass occupying 0.15 to 0.5 inches in diameter, and the metal shell 0.2 to 1 inch in diameter. Naturally, the glass pre-form occupies the volume between the central fiber and the interior wall of the metal shell. Sapphire fiber is known to have a melting point on the order of 2000° C., 304 stainless steel, and 718 Inconel, both melt at approximately 1200° C., therefore, it is possible to melt the sealing glass at a temperature that is well below the melting points of the other materials. Although sapphire has been characterized as having a melting point of approximately 2000° C., glasses do not have conventional melting points since they are amorphous and the melting point is taken to indicate that it has softened, becomes flowable, or achieves a molten state. The specific pyrotechnic of the example was a mixture of $TiH_{1.65}$ and $KClO_4$. Inconel 718 has as its major components the following: about 50 weight percent nickel, about 22 weight percent iron, about 18 weight percent chromium, about 5 weight percent niobium, about 3 weight percent molybdenum, and the balance less than 1 weight percent each of titanium, aluminum, strontium, and carbon. While 304 stainless steel has as its major components the following: 0.8 weight percent carbon, 2.0 weight percent manganese, 1.0 weight percent silicon, 19 weight percent chromium, 10 weight percent niobium, and the remainder is iron.

The assemblies as per the example and in FIG. 2 were found to be relative stress free and crack free due to only small differences in the thermal expansion coefficients among the metal shell, the sealing glass, and the sapphire whisker. Such assemblies were determined to be hermetic, with helium leak rates of less than $1 \times 10^{-8}$ cubic centimeter per second. In addition, their optical transmission properties were found to be excellent, with transmission of greater than about 80 percent, which demonstrates that an optical fiber was formed during the process of the invention. Such high strength assemblies of the invention have been fabricated and loaded with pyrotechnic and then optically fired with a laser. Components were found to have successfully withstood pressures in excess of 100,000 psi proving their high strength capabilities. Accordingly, the method of the invention fabricated a hermetic essentially crack free optical fiber assembly.

Although specific examples have been described, any glass fiber or sapphire fiber which is optically transparent at the wave length of interest and which has an index of refraction which can be matched to the sealing glass, and which forms a hermetic seal with the sealing glass can be used. Such components could be used in all aspects of laser ignited ordnance, as well as in pressure, vacuum, and hostile conditions, and as optical feed-throughs and connectors. The method of the invention provides good hermetic seals because the TEC of the metal shell is higher than that of the sealing glass which in turn is higher than that of the fiber. Therefore, as the assembly cools after the heating cycle, the metal shell will squeeze down on the sealing glass which will in turn squeeze down on the fiber. This is highly desirable since ceramic materials, such as glass, are strong in compression and good tight seal is accomplished without thermal stresses and cracking.

While this invention has been described in terms of certain embodiments thereof, it is not intended that it be limited to the above description, but rather only to the extent set forth in the following claims.

The embodiments of the invention in which an exclusive property or privilege is claimed are defined in the claims:

1. A fiber optic apparatus formed situ comprising:
   (a) a fiber having two ends, a length, and a given index of refraction; and
   (b) a sealing medium having a given index of refraction which is less than said given index of refraction of said fiber, and said sealing medium further having the characteristics of softening and flowing upon application of heat and subsequently hardening upon cooling;

wherein the apparatus is produced by a method comprising the steps of:
   (i) positioning said sealing medium about said fiber so that at least a portion of said sealing medium is circumjacent with respect to at least part of said length of said fiber;
   (ii) heating said sealing medium sufficiently to cause it to soften and flow about said fiber; and
   (iii) cooling said sealing medium so that it hardens surrounding at least a part of said length of said fiber, wherein said fiber then functions as a core of a fiber optic and said sealing medium then functions as cladding for said fiber optic.

2. The fiber optic apparatus of claim 1 wherein said fiber is glass.

3. The fiber optic apparatus of claim 1 wherein said fiber is sapphire.

4. The fiber optic apparatus of claim 11 wherein said sealing medium is glass, and further comprising a metal holder wherein an end of said fiber is located in said glass in a cavity of said metal holder and said glass is sealed to said fiber in said metal holder, and further wherein:
   a. said metal holder has a coefficient of thermal expansion equal to or greater than said glass coefficient of thermal expansion; and
   b. said glass has a coefficient of thermal expansion equal or greater than said fiber coefficient of thermal expansion.

5. The fiber optic apparatus set forth in claim 4 wherein:
   a. said fiber coefficient of thermal expansion is in the range of from $50 \times 10^{-7}$ cm/cm/°C. to $120 \times 10^{-7}$ cm/cm/°C. at temperatures in the range of from room temperature to 400° C.;
   b. said glass coefficient of thermal expansion is in the range of from $75 \times 10^{-7}$ cm/cm°C. to $150 \times 10^{-7}$ cm/cm/°C. at temperatures in the range of from room temperature to 400° C.; and wherein
   c. said metal holder coefficient of thermal expansion is in the range of $100 \times 10^{-7}$ cm/cm/°C. to $200 \times 10^{-7}$ cm/cm/°C. at temperatures in the range from room temperature to 400° C.

6. The improvement set forth in claim 4 wherein:
   a. said fiber is a single crystal sapphire having coefficient of thermal expansion is about $75 \times 10^{-7}$ cm/cm/°C. at temperatures in the range of from room temperature to 400° C.;
   b. said glass coefficient of thermal expansion is about $100 \times 10^{-7}$ cm/cm/°C. at temperatures in the range of from room temperature to 400° C.; and wherein
   c. said metal holder coefficient of thermal expansion is about $180 \times 10^{-7}$ cm/cm/°C. at temperatures in the range of from room temperature to 400° C.

7. The fiber optic apparatus set forth in claim 4 wherein said glass has a softening point less than about 900° C. and said fiber has a softening point above about 900° C.

8. The fiber optic apparatus set forth in claim 4 wherein said fiber is a single crystal sapphire having a melting point of about 2000° C. and said glass has a softening point of about 850° C.

9. A method for making a fiber optic in situ comprising the steps of:
   (a) providing a fiber having two ends, a length, and a given index of refraction;
   (b) providing a sealing medium having a given index of refraction which is less than said given index of refraction of said fiber, and said sealing medium further having the characteristics of softening and flowing upon application of heat and subsequently hardening upon cooling;
   (c) positioning said sealing medium about said fiber so that at least a portion of said sealing medium is circumjacent with respect to at least part of said length of said fiber;
   (d) heating said sealing medium sufficiently to cause it to soften and flow about said fiber; and
   (e) cooling said sealing medium so that it hardens surrounding at least a part of said length of said fiber;
   whereby said fiber then functions as a core of a fiber optic and said sealing medium then functions as cladding for said fiber optic.

10. The method of claim 9 wherein said fiber is glass.

11. The method of claim 9 wherein said fiber is sapphire.

12. The method of claim 9 wherein said sealing medium is glass, and further comprising the step of assembling the fiber optic in a metal holder wherein an end of said fiber is located in said glass in a cavity of said metal holder and said glass is sealed to said fiber, wherein:
   a. said metal holder has a coefficient of thermal expansion equal to or greater than said glass coefficient of thermal expansion; and
   b. said glass has a coefficient of thermal expansion equal to or greater than said fiber coefficient of thermal expansion.

13. The method set forth in claim 12 wherein:
   a. said fiber coefficient of thermal expansion is at least about $50\times10^{-7}$ cm/cm/°C. at temperatures in the range of from room temperature to 400° C.;
   b. said metal holder coefficient of thermal expansion is up to about $200\times10^{-7}$ cm/cm/°C. at temperatures in the range from room temperature to 400° C.; and wherein
   c. said glass coefficient of thermal expansion is equal to or less than that of said metal holder and equal to or greater than that of said fiber.

14. The method set forth in claim 1 wherein:
   a. said fiber coefficient of thermal expansion is in the range of from $50\times10^{-7}$ cm/cm/°C. to $120\times10^{-7}$ cm/cm/°C. at temperatures in the range of from room temperature to 400° C.;
   b. said glass coefficient of thermal expansion is in the range of from $75\times10^{-7}$ cm/cm/°C. to $150\times10^{-7}$ cm/cm/°C. at temperatures in the range of from room temperature to 400° C.; and wherein
   c. said metal holder coefficient of thermal expansion is in the range of $100\times10^{-7}$ cm/cm/°C. to $200\times10^{-7}$ cm/cm/°C. at temperatures in the range from room temperature to 400° C.

15. The method set forth in claim 12 wherein:
   a. said fiber coefficient of thermal expansion and said glass coefficient of thermal expansion are each about $75\times10^{-7}$ cm/cm/°C. at temperatures in the range of from room temperature to 400° C.; and wherein
   b. said metal holder coefficient of thermal expansion is about $180\times10^{-7}$ cm/cm/°C. at temperatures in the range of from room temperature to 400° C.

16. The method set forth in claim 12 wherein said fiber is a single crystal sapphire having a coefficient of thermal expansion of about $75\times10^{-7}$ cm/cm/°C. at temperatures in the range of from room temperature to 400° C.

17. The method set forth in claim 12 wherein said glass has a softening point less than about 900° C. and said fiber has a softening point above about 900° C.

18. The method set forth in claim 12 wherein said fiber is a single crystal sapphire having a melting point of about 2000° C. and said glass has a softening point of about 850° C.

* * * * *